Sept. 17, 1946.    J. E. JOHNSON    2,407,746
OSCILLATING WELDING ROD
Filed Dec. 2, 1944
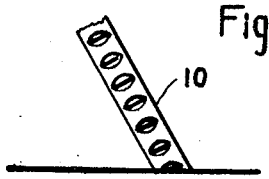
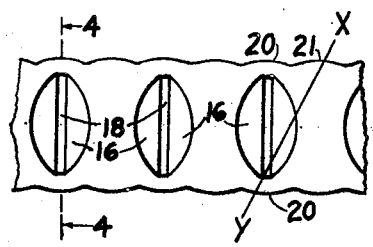
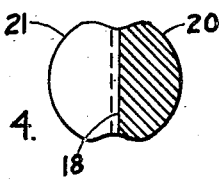
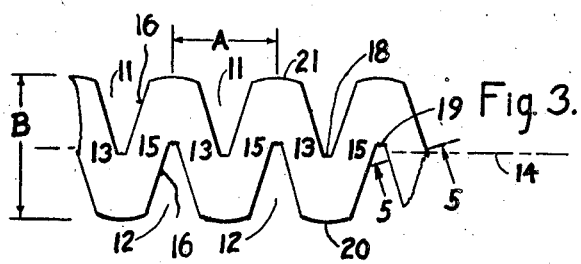
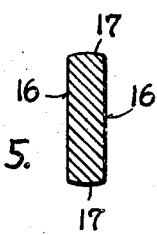
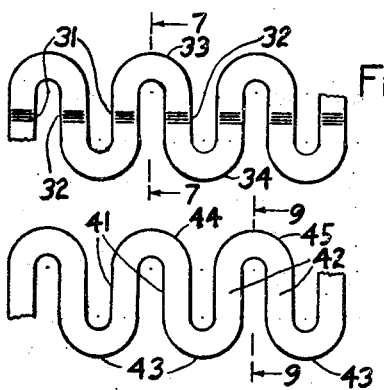
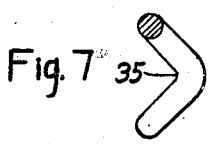
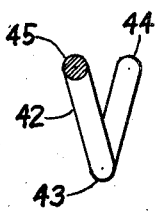
Inventor
Jesse Emery Johnson
By H. E. Mueth
Attorney Patented Sept. 17, 1946

2,407,746

UNITED STATES PATENT OFFICE 2,407,746

OSCILLATING WELDING ROD

Jesse E. Johnson, Colbert, Wash.

Application December 2, 1944, Serial No. 566,293

8 Claims. (Cl. 219—8)

1

The present invention relates to improvements in welding rods. Customarily, such rods comprise long, slender cylindrical wires which in use are manually oscillated back and forth to effect uniform spreading of molten metal as the tip of the rod melts. In arc-welding apparatus, a perfect weld can be obtained only if the oscillation of the electrode is continuous and regular, since if the electrode remains in one spot too long, that particular point on the work will overheat. This results in burning or undercutting the work.

It is, therefore, the prime object of the present invention to provide a welding rod of novel configuration, so designed as to obviate the need of manual oscillation.

A further object resides in the provision of a rod having peculiarities of structure so that the progressive fusion of the rod tip will automatically shift the point of fusion in lateral oscillations with respect to the work and will thus prevent burning or undercutting.

A further object of the invention resides in the provision of a welding rod having the characteristics mentioned above, and yet having a generally circular or triangular external shape so that it may be easily adapted for use in existing types of welding equipment.

A further object of the invention is the provision of the rod as defined above wherein the structure and configuration of the rod is so designed as to give satisfactory handling qualities and normal rigidity.

The foregoing objects are accomplished in the disclosure of the present application by the provision of a rod including reversely formed zigzag portions lying at an acute angle to each other, joined at their outer ends, and having an external shape approximating a cylindrical or triangular form. When a rod of this character is applied to the work, the progressive fusing of the tip will cause the point of contact with the work to oscillate back and forth as the rod is consumed, this automatically shifting the point of fusion and preventing undercutting.

It is known that prior attempts to accomplish this result by peculiarities of rod formation have been made, but the present inventor submits that prior structures designed to accomplish the result achieved by the present invention have been unsuccessful for reasons that will appear as the present description proceeds.

It is submitted that the present inventor has proposed the first structure by which the automatic shifting or oscillation of the fusing point may be successfully accomplished. One under-

2 lying reason for this resides in the fact that prior devices devised for the purpose have been of such design that the rod tip would be guided by engagement of the tip with the opposite walls of the two metal surfaces being welded together, so that the guiding effect of the work on the rod would maintain the point of fusion at a fixed point.

The aforementioned objections to prior structures have been successfully overcome and the objects of the present invention accomplished by the peculiarly novel structure of welding rods illustrated in the drawing attached to and forming a part of the present specification.

In the drawing,

Figure 1 is a side elevational view of a fusable welding rod illustrated in a typical position with respect to the work.

Figure 2 is a greatly enlarged side elevational view of a fragmental portion of the rod illustrated in Figure 1.

Figure 3 is a greatly enlarged plan view of the rod illustrated in Figure 2.

Figure 4 is a detail sectional view taken on the plane of the line 4—4 in Figure 2.

Figure 5 is a detail sectional view taken on the plane of the line 5—5 in Figure 3.

Figure 6 is a plan view of a modified form of rod.

Figure 7 is a detail sectional view taken on the plane of the line 7—7 of Figure 6.

Figure 8 is a plan view of a second modified form of rod.

Figure 9 is a detail sectional view taken on the plane of the line 9—9 in Figure 8.

The preferred embodiment of the invention is illustrated in Figures 1 to 5 inclusive. This form of the rod may be manufactured by any one of the several methods, although it is contemplated that one satisfactory method of manufacture is to form a standard cylindrical-shaped wire or rod by rolling or clamping it between opposite sets of pointed teeth, so that the completed welding rod 10 is formed to include oppositely disposed V-shaped notches 11 and 12 which are alternately positioned on opposite sides of the rod and intermediate to each other, so that the finished rod includes a multiplicity of straight diagonal portions 13 extending in an angular direction with respect to the longitudinal axis 14 of the rod. The portions 13 are joined by similar straight diagonal portions 15 which also extend in a diagonal direction with respect to the axis 14 of the rod, but are oppositely arranged, so as to form an acute angle between the portions 13 and 15. Both sides of the V-notches 11 and 12 are flat, so that the opposite faces 16 of the portions 13 and 15 will be flat and parallel. These faces define the width of the diagonal portions. The upper and lower ends 17 of the diagonal portions may be flat or slightly convex. It will be noted from an examination of Figure 5 that the notches 11 and 12 are so spaced that the thickness between the vertical surfaces 17 is more than double the width between the side surfaces 16, so that the straight diagonal may be said to comprise relatively narrow and thick ribbons. The substantial thickness of these portions of the rod give it sufficient rigidity for convenient handling, and overcome any tendency for the tip of the rod to be guided by contact with the work.

The extreme points of the notches 11 and 12 are flattened as indicated at 18 and 19 so that as the stock is clamped or rolled between the forming tools a portion of the metal between any two adjoining sections 13 and 15 will be forced outwardly into somewhat bulbous portions 20 and 21. Each of these portions has a flat inner surface and a generally arcuate outer face, forming an approximate D shape when viewed in cross-section. (See Figure 4.)

If desired, the spacing and thickness of the several portions of the rod may be so designed that the arcuate surface of the bulbous portions on one side of the rod and the arcuate surfaces of the portions 21 on the opposite side of the rod are concentric. With this arrangement it will be apparent that although the rod possesses the advantages of an irregular formation as herein pointed out, yet it is generally cylindrical-shaped, so that it will fit perfectly any existing welding electrode holder or other fittings designed for use with a cylindrical rod.

The modified form of the invention illustrated in Figures 6 and 7 is particularly adapted to welding in corners. In this form of the invention the oppositely disposed portions 31 and 32 are interconnected at their ends by arcuate reverse bends 33 and 34. The portions 31 and 32 are also bent at right angles to these bends, so that they include a center bend 35 of generally V shape. Thus the overall configuration of the rod is somewhat triangular in form.

A similar modification is illustrated in Figures 8 and 9. In this form of the invention the straight portions 41 and 42 lie in parallel relationship to each other and are interconnected at their ends by arcuate reverse bends 43, 44, and 45. Each of the bends 43 is twisted, however, so that the alternate loops of the rod lie in different planes. Thus the straight portions 41 and bends 44 lie in one plane, and the alternate loops comprising the straight portions 42 and bends 45 lie in a plane at an angular relation thereto. (See Figure 9.)

It has been previously mentioned that while one of the principal objects of the invention is to provide a welding rod in which the progressive fusing of the rod tip would cause its point of contact to oscillate back and forth with respect to the work, it is desirable that this result be accomplished without a tendency for the work to guide the rod. This is ideally accomplished in the form of the invention illustrated in Figures 1 to 5, where it will be seen that the linear distance A between two adjoining similar portions of the rod is no greater than the width or diameter as indicated at B. Thus if the rod is positioned at a normal working angle with respect to the work, the line of fusion of the rod will be at an acute angle with the longitudinal axis of the rod. For an example, assume a position as shown in Figure 1. This position will result in a line of fusion as indicated by the line X—Y with the configurations of the rod, and it will be seen that one end of the line will cut through the upper part of one of the bulbous portions 21 on one side of the rod, while the opposite end of the line will simultaneously cut through the lower extremity of one of the bulbous portions 20 on the opposite side of the rod. Thus there will be contact from one side of the rod to the other at all times, but as the fusion of the rod takes place the contact will be reversed from side to side. Moreover, the combination of the closely spaced bulbous portions joined by narrow but thick interconnecting members means that melting of the rod will free sufficient molten metal to flow over the full area of the V-shaped notches and provide a uniform welding bead the full width of the rod.

In the forms of the invention illustrated in Figures 6 to 9 inclusive, a similar result is accomplished by the provision of the several convolutions of the rod in V shape with respect to each other, so that the V members serve to hold the rod in fixed position and the fusion point moves back and forth as the rod is consumed.

Three forms of the invention, chosen as best illustrative of the inventive thought, have been illustrated in the drawing of this specification. It is understood, however, that further modifications may be made without departing from the spirit of disclosure, and it is accordingly requested that the scope of the invention be regarded as limited only by the terms of the appended claims.

I claim:

1. As an article of manufacture, a fusible rod having a generally long, slender shape, said rod comprising a multiplicity of straight portions extending in a direction diagonal to the longitudinal axis of the rod; the said diagonal portions being of a thickness not less than double their width, and being alternately disposed to form acute angle V-shaped notches on the opposite sides of the rod; said diagonal portions being joined to each other at their ends by bulbous portions of general D cross section and of thickness greater than their maximum width; the alternate D shaped portions having their outer surfaces arcuately formed and concentric with each other to provide a rod of generally cylindrical exterior dimensions.

2. As an article of manufacture, a fusible rod having a generally long, slender shape, said rod comprising a multiplicity of diagonal portions at an angle to the longitudinal axis of the rod; the said diagonal portions being alternately disposed and joined to each other at their ends by bulbous portions of general D cross section and of thickness greater than their maximum width.

3. As an article of manufacture, a fusible rod having a generally long, slender shape, said rod comprising a multiplicity of straight portions extending in a direction diagonal to the longitudinal axis of the rod; the said diagonal portions being of a thickness not less than double their width, and being alternately disposed to form V-shaped notches on the opposite sides of the rod; said diagonal portions being joined to each other at their ends by bulbous portions.

4. As an article of manufacture, a fusible rod having a generally long, slender shape, and comprising a multiplicity of reverse bends; the individual bends being of non-circular cross section and of thickness greatly in excess of their width, the bends being closely formed with respect to each other so that the linear distance between said bends is not greater than the width of the rod.

5. As an article of manufacture, a fusible rod having a generally long, slender shape, and comprising a multiplicity of reverse bends including end loops on opposite sides of the rod, the end loops being joined by connecting portions of V shape, so that alternate loops lie in a plane common to each other, and intermediate loops lie in a plane at an angle thereto.

6. As an article of manufacture, a fusible rod having a generally long, slender shape, and comprising a multiplicity of reverse bends, including end loops on opposite sides of the rod, the end loops on one side of the rod being twisted so that the alternate bends lie in different planes, at an angle to each other.

7. As an article of manufacture, a fusible rod having a generally long, slender shape, said rod comprising a multiplicity of straight portions extending in a direction at an angle to the longitudinal axis of the rod; the said straight portions being alternately disposed to form notches on the opposite sides of the rod, the notches having their opposite faces positioned at an angular separation of less than a right angle with respect to each other; said straight portions being inter-connected at their ends by connecting portions having their outer surfaces arcuately formed.

8. As an article of manufacture, a fusible rod having a generally long slender shape, said rod comprising a multiplicity of reverse bends including end loops and intermediate portions connecting the bends and extending in a direction at an angle to the axis of the rod, the intermediate portions being alternately disposed to form notches on the opposite sides of the rod, the notches having a substantially greater depth than the distance between their opposite faces and the reverse bends having a thickness substantially greater than their maximum width.

JESSE E. JOHNSON.